(12) United States Patent
Kunori (10) Patent No.: US 9,235,720 B2
(45) Date of Patent: Jan. 12, 2016

(54) IMAGE PROCESSING APPARATUS, INFORMATION PROCESSING METHOD, PROGRAM, AND STORAGE MEDIUM

(75) Inventor: Shiro Kunori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1639 days.

(21) Appl. No.: 11/299,979

(22) Filed: Dec. 12, 2005

(65) Prior Publication Data

US 2006/0129912 A1 Jun. 15, 2006

(30) Foreign Application Priority Data

Dec. 13, 2004 (JP) .................................. 2004-360494
Jun. 9, 2005 (JP) .................................. 2005-170051

(51) Int. Cl.
*G06F 21/62* (2013.01)
*G06F 17/30* (2006.01)
*G06F 17/22* (2006.01)
*G06F 21/60* (2013.01)

(52) U.S. Cl.
CPC ........ *G06F 21/6209* (2013.01); *G06F 17/2235* (2013.01); *G06F 17/30884* (2013.01); *G06F 21/608* (2013.01); *G06F 2221/2149* (2013.01)

(58) Field of Classification Search
CPC .......... G06F 17/30884; G06F 17/2235; G06F 17/3089; G06F 17/30867; G06F 17/30014; G06F 21/00; G06F 2221/2149
USPC .............................. 715/205, 206, 273; 726/16
See application file for complete search history.

(56) References Cited

U.S. PATENT DOCUMENTS

| 6,037,934 A * | 3/2000 | Himmel et al. ............... 715/760 |
| 6,211,871 B1 * | 4/2001 | Himmel et al. ............... 715/744 |
| 6,567,918 B1 * | 5/2003 | Flynn et al. ....................... 726/7 |
| 7,321,931 B2 * | 1/2008 | Banerjee et al. ............... 709/224 |

(Continued)

FOREIGN PATENT DOCUMENTS

JP 2002-082746 3/2002
JP 2002-259339 A 9/2002

(Continued)

OTHER PUBLICATIONS

Vermeersch, Scott, "Public Web Browser", Archived Feb. 14, 2002 http://teamsoftware.bizland.com/projects.htm.*

(Continued)

*Primary Examiner* — Adam M Queler
(74) *Attorney, Agent, or Firm* — Cowan, Liebowitz & Latman, P.C.

(57) ABSTRACT

In providing an image processing apparatus having a browser, it is aimed to improve the operability of the web browser and enhance access restriction. In order to solve conventional problems, an information processing method according to the present invention has the following steps. That is, an information processing method for a browser which operates in an image processing apparatus communicably connected to a network and receives and displays a content from the network includes a detection step (step S902) of detecting whether link information to another content included in a content permitted to be displayed by the browser is selected, and a restriction step (steps S903 and S904) of restricting access to another content in the case the link information to another content is detected to be selected in the detection step.

7 Claims, 12 Drawing Sheets

(56) References Cited

U.S. PATENT DOCUMENTS

| | | | |
|---|---|---|---|
| 7,421,733 B2* | 9/2008 | Glassman et al. | 726/6 |
| 2003/0212913 A1* | 11/2003 | Vella | 713/202 |
| 2003/0233437 A1* | 12/2003 | Kitada et al. | 709/223 |
| 2004/0010710 A1* | 1/2004 | Hsu et al. | 713/201 |
| 2004/0073609 A1 | 4/2004 | Maekawa et al. | |
| 2004/0073713 A1* | 4/2004 | Pentikainen et al. | 709/249 |
| 2004/0117839 A1* | 6/2004 | Watson et al. | 725/87 |
| 2004/0198456 A1* | 10/2004 | Kelkar | 455/566 |
| 2005/0060565 A1* | 3/2005 | Chebolu et al. | 713/200 |

FOREIGN PATENT DOCUMENTS

| | | |
|---|---|---|
| JP | 2004038526 A | 2/2004 |
| JP | 2004-172923 | 6/2004 |

OTHER PUBLICATIONS

Merrill, David C., The Linux FAQ, Revision 2.1.2, Ch. 12, Feb. 28, 2004 http://www.ibiblio.org/pub/Linux/docs/faqs/Linux-FAQ/Linux-FAQ.pdf.*

Bug 22183, UI spoofing can cause user to mistake content for chrome, Bugzilla, Firefox, Comments 1-216, Last Comment Nov. 14, 2004 https://bugzilla.mozilla.org/show_bug.cgi?format=multiple&id=22183.*

Eric Pascarello, "Disable All Links with JavaScript", Eric's weblog, May 17, 2005, retrieved via archive.org http://radio.javaranch.com/pascarello/2005/05/17/1116355421179.html.*

"Internet Explorer" Archived on Dec. 31, 2003 (archive.org) http://www.lib.uom.gr/accelerate/ttu_en/ie.html.*

David Flanagan, JavaScript: The Definitive Guide, 4th Edition, Jan. 2002, O'Reilly, Chapter 19.1 http://docstore.mik.ua/orelly/webprog/jscript/ch19_01.htm.*

"Windows 2000 World vol. 6 No. 9 Chapter 13—Internet Explorer (2)", IDG Japan, Inc., Sep. 1, 2001, pp. 156-162.

A May 25, 2009 Japanese Office Action that issued in Japanese Patent Application No. 2005-170051, which is enclosed without English Translation.

A Oct. 5, 2009 Japanese Office Action that issued in Japanese Patent Application No. 2005-170051, which is enclosed without English Translation.

\* cited by examiner

```
<html lang"ja-jp">
<head>
...
<title>XXXX : XXXXPOMEPAGE</title>
...
</head>
<table width="100%" border="0" cellspacing="0" cellpadding="0">
<tr>
...
<a_href="http://cweb.xxxx.jp/product/index.html" title
="PRODUCT INFORMATION" · · ·>
<img src="/common-img/h-pro.gif" alt
="PRODUCT INFORMATION ICON" · · ·>
</a>
...
</tr>
</html>
```

IMAGE PROCESSING APPARATUS, INFORMATION PROCESSING METHOD, PROGRAM, AND STORAGE MEDIUM

FIELD OF THE INVENTION

The present invention relates to an information processing technique in an image processing apparatus communicably connected to a network.

BACKGROUND OF THE INVENTION

Conventionally, a web browser which accesses a web server on a network and receives and displays various contents in the web server has been widely known. Generally, various user-friendly functions are added to a web browser. Examples of such functions are a favorites function (bookmark function), access restriction function, and the like.

A favorites function makes easy access to a specific web page by registering information (e.g., URL) for access to the specific web page and invoking the registered information when access to the web page is made again.

An access restriction function limits accessible (displayable) web pages. By using the function to limit access, unauthorized use can be prevented and security can be improved. Particularly, when many and unspecified persons use the web browser, this function is very effective.

Furthermore, in addition to these functions, a function of downloading and displaying a favorites content from a web server when the web browser is activated (e.g., Japanese Patent Laid-Open No. 2002-82746), and a function of reading information of a user from a card or the like to inhibit access to a charged site (e.g., Japanese Patent Laid-Open No. 2004-172923), and the like have been proposed.

While functions of a web browser improve, recently, demand has arisen for an image processing apparatus such as a printer or copying machine to retrieve information on the Internet or download a content on the Internet. Therefore, a web browser is considered to be installed in an image processing apparatus.

However, installing a web browser in an image processing apparatus is different from that in an information processing apparatus such as a PC (Personal Computer) since many and unspecified users or a user unfamiliar to web browser operation may use the web browser on the image processing apparatus. These users need to be taken into account.

For this reason, in order to prevent one user from occupying and using the browser for a long period, a web browser in an image processing apparatus is demanded to enhance access restriction compared to a PC. Also, a UI is demanded to be configured so that a user unfamiliar to web browser operation can readily operate it.

Accordingly, as described above, a function of downloading and displaying an initial display window from a web server and a function of inhibiting display of a charged service web page are not enough as functions to be implemented in the web browser of an image processing apparatus.

SUMMARY OF THE INVENTION

The present invention has been made in consideration of the above problem, and has as its object to improve the operability of a web browser and enhance access restriction in providing an image processing apparatus communicably connected to a network and having a browser for receiving and displaying a content from the network.

In order to achieve the above object, an image processing apparatus according to the present invention has the following arrangement.

That is, an image processing apparatus communicably connected to a network and having a browser for receiving and displaying a content from the network, wherein the browser comprises detection unit configured to detect whether link information to another content included in a content displayed by the browser is selected, and restriction unit configured to restrict access to the another content in the case the detection unit detects that the link information to the another content is selected.

According to the present invention, the operability of the web browser can be improved and access restriction can be enhanced in providing an image processing apparatus communicably connected to a network and having a browser for receiving and displaying a content from the network.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Arrangement of Control Unit of Image Processing Apparatus

Figure 1:
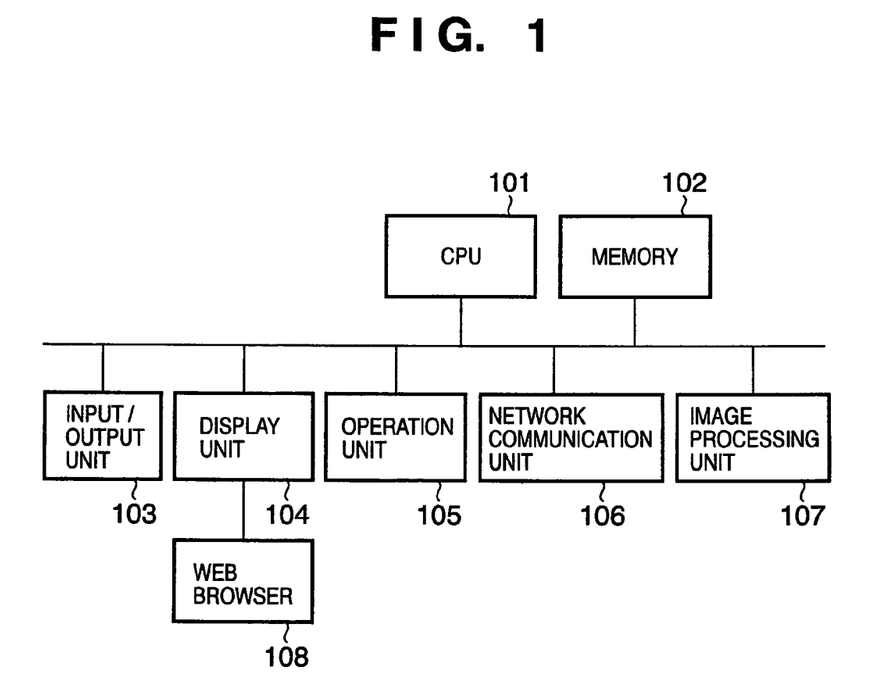
FIG. 1 is a block diagram showing the arrangement of a control unit of an image processing apparatus common to embodiments of the present invention.

FIG. 1 is a block diagram showing the arrangement of a control unit of an image processing apparatus (copying machine) common to embodiments of the present invention. The control unit of the image processing apparatus comprises a CPU 101 for determining an input and executing predetermined processing and determination, a memory 102 for storing various pieces of information, an input/output unit 103 for inputting/outputting setting information and link destination information, a display unit 104 for displaying information through, e.g., a web browser 108, an operation unit 105 for performing input/output to/from the input/output unit 103 on the basis of information displayed on the display unit 104, a network communication unit 106 for communicating with an external device such as a web server, and an image processing unit 107 for processing an image.
<Arrangement of Operation Unit of Image Processing Apparatus>

Figure 2:
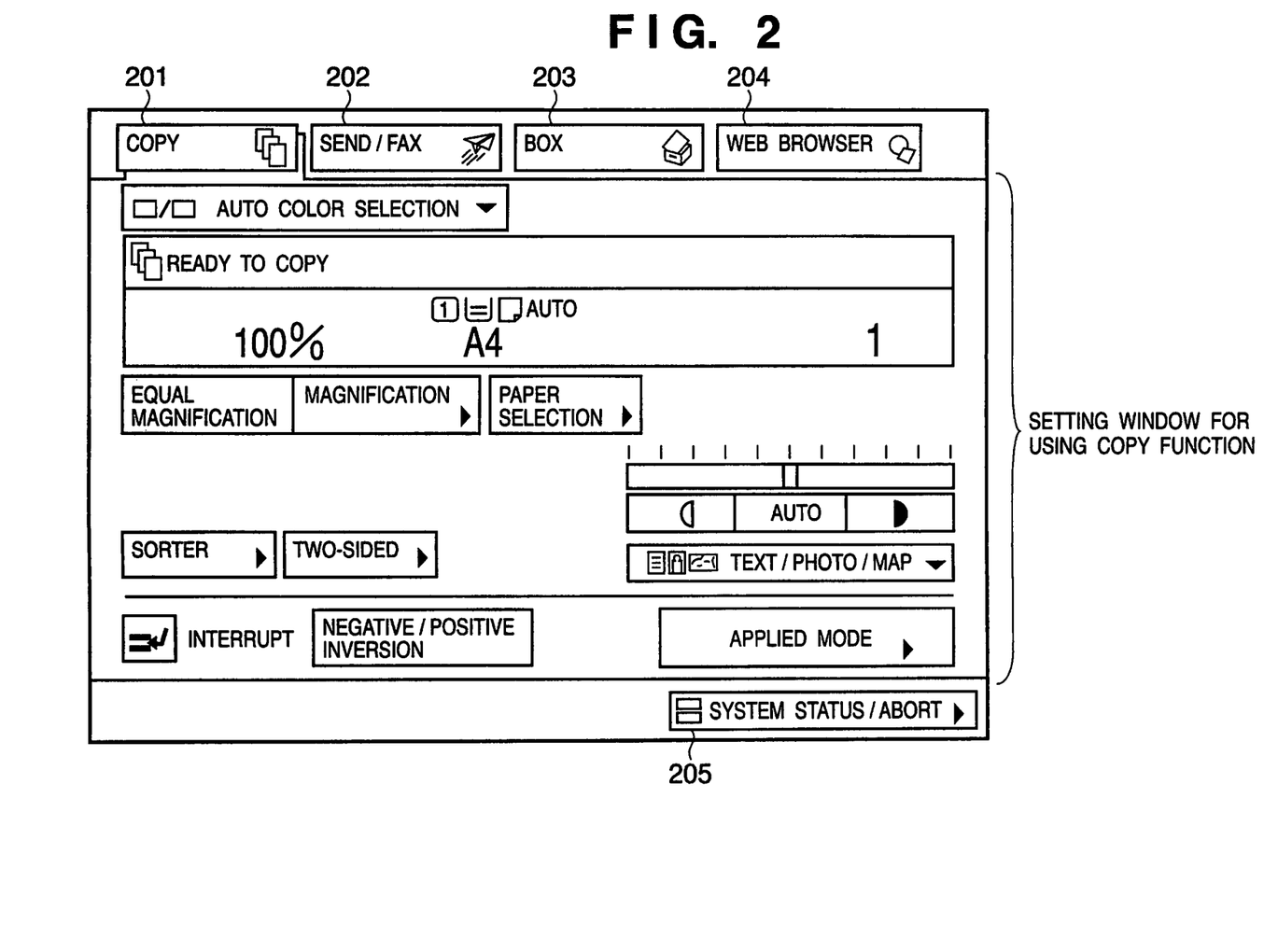
FIG. 2 is a view showing a detailed example of a window displayed on the display unit of the image processing apparatus.

FIG. 2 is a view showing a detailed example of a window displayed on the display unit 104 of the image processing apparatus. The display unit 104 is formed of a touch panel and has a function as the operation unit 105 as well. Therefore, setting can be performed not only by operating a keyboard or mouse attached to a main body but also by touching (pressing) an icon (to be referred to as a button as well) representing each setting item.

On the display unit 104, in addition to icons for setting, a copy icon 201 for shifting to a setting window for using a copy function, a send/fax icon 202 for shifting to a setting window for using a sending function or faxing function, a box icon 203 for shifting to a setting window for using a box function (function of storing data in a box), a system status/abort icon 205 for shifting to a window displaying a system status of the image processing apparatus, and a web browser icon 204 for shifting to a window for using a web browser function (to be also referred to as a web browser). FIG. 2 shows the setting window displayed when using the copy function.

A case in which the web browser icon 204 is pressed to use the web browser function will be described below.
<Initial Window>

An initial window display function in a case of pressing the web browser icon 204 to activate the web browser will be described first.

On the window of FIG. 2, when the web browser icon 204 is pressed, the web browser is activated (accurately, on the basis of touched coordinates, the CPU 101 invokes the corresponding function from the memory 102 and sends an execution instruction for executing the function). When the execution instruction is determined to indicate web browser activation, the CPU 101 prepares to display an icon-displayed initial window as an initial display window of the web browser.

Figure 3:
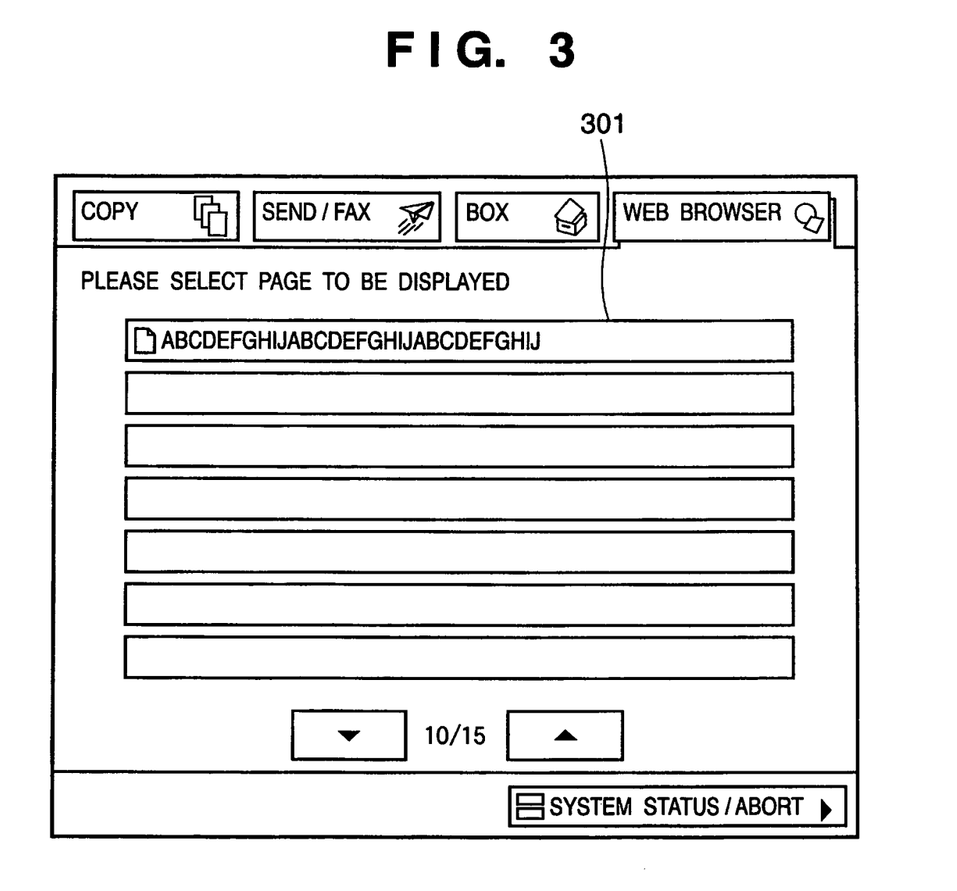
FIG. 3 is a view showing a detailed example of an initial window.

A preparation for displaying the initial window is to invoke all "icons to display favorites page access information (to be referred to as favorites icons)" registered in the memory 102 in advance and display the icons in a list. By pressing one of the icons, access to a URL of a favorites page recorded in the memory 102 corresponding to the icon can be readily made. FIG. 3 is a view showing a detailed example of the initial window of icon display.

In FIG. 3, as the favorites icon, a bitmap icon 301 indicating "abcdefghijabcde . . . " is displayed. When the icon 301 is pressed, the user advances to the corresponding web page under the control of the CPU 101.

Note that in FIG. 3, the icon represents characters, however, the icon can represent an image. In FIG. 3, seven favorites page icons are displayed, however, six icons other than the icon 301 are icons representing the current window (icon-displayed favorites window) (that is, even when the corresponding icon is pressed, the window does not shift to another web page and the same window as present one is displayed).

As described above, in the case of the image processing apparatus according to this embodiment, the icon-displayed initial window is displayed when activating the web browser. The user selects, from the initial window, an icon for making access to a web page which he/she wants to display, and presses the icon to display the web page.

The configuration in which a web page is displayed only by pressing an icon makes it possible to display only the web page registered as favorites. Accordingly, a user cannot display a web page not registered as favorites by inputting a URL directly. As a result, an access restriction function in which only a specific web page is displayable as the initial display window can be implemented.

A list of favorites can be displayed by a predetermined operation except the time of activation of the web browser.
<Access Restriction Function after Initial Window Display>

Figure 9:
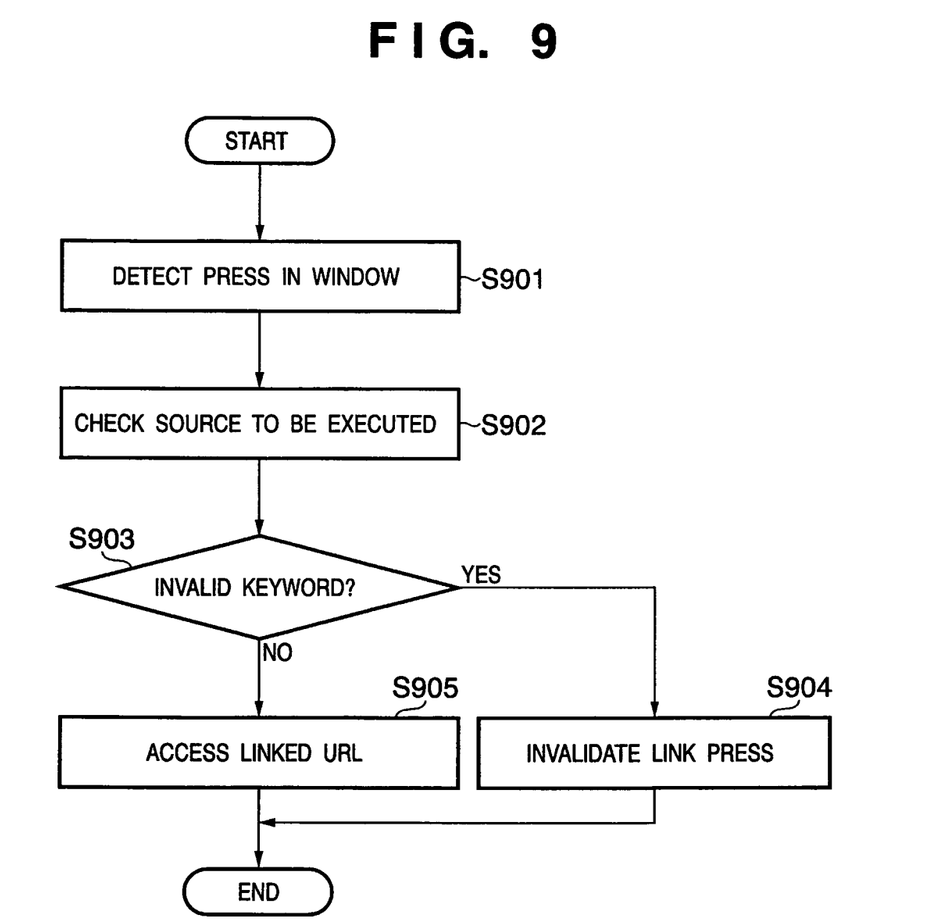
FIG. 9 is a flowchart showing the flow of processing of access restriction after initial window display.

An access restriction function after initial window display will be described next. The above-described access restriction function of the initial display window still allows a user to shift to an arbitrary web page by proceeding through a hyperlink arranged in the web page designated by a bookmark. That is, a general user can make access to a charged site and harmful site (a site which affects the system by virus or the like and site which makes another people unpleasant). This is not preferable in an image processing apparatus used by many and unspecified persons. The arrangement to be described below implements the access restriction function after initial window display. The processing when the icon 301 displayed in the initial window is pressed will be described below (a processing flow is shown in FIG. 9).

Note that when a user finishes using the web browser before or after pressing the icon 301 and uses another function such as the copy function or box function, the user can shift to the window by pressing the corresponding icons 201 to 203, or 205.

When the icon 301 is pressed, the CPU 101 detects that the icon 301 has been pressed, invokes from the memory 102 a URL "http://xxxx.jp/" stored in correspondence with the icon, and makes access to the window corresponding to the URL. As a result, a window as shown in FIG. 4 is displayed (the window is displayed in the same manner as a general web browser used in a PC or the like).

Figure 4:
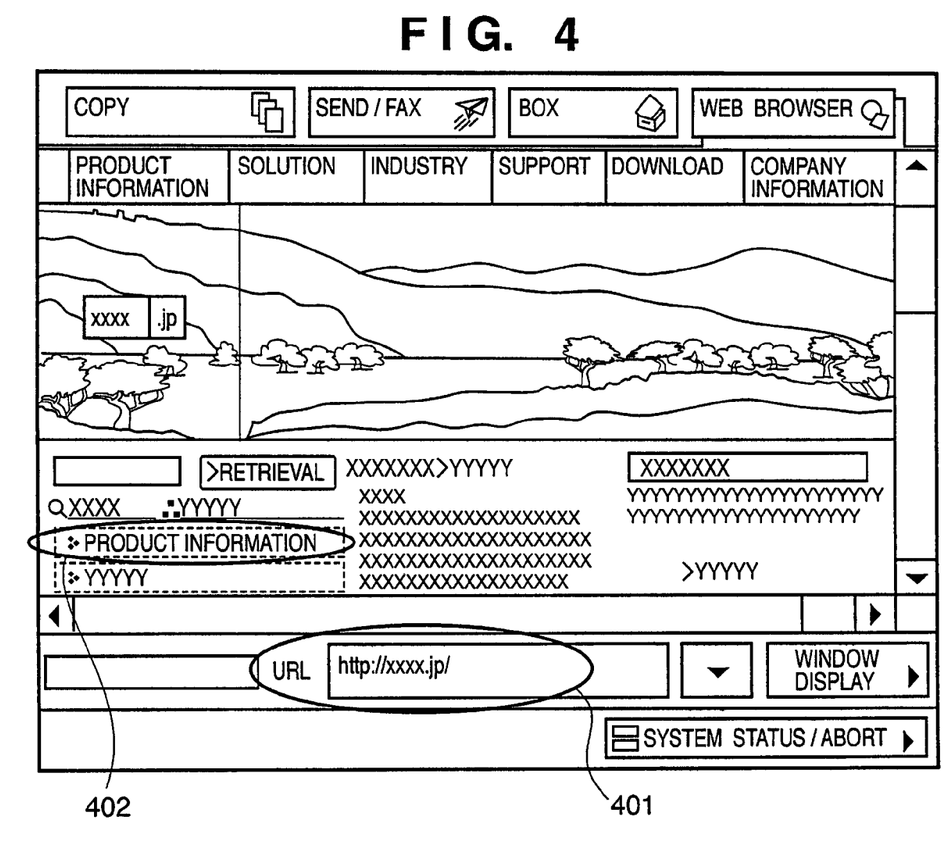
FIG. 4 is a view showing an example of a web browser window.

A URL address display area 401 located at lower middle of FIG. 4 displays a URL of the currently displayed web page. A general user cannot input a URL therein (nothing will occur when this area is pressed).

In the window of FIG. 4, a link to another web page (e.g., an icon 402 written with "product information") is pressed. When the CPU 101 detects that the user has pressed the window (step S901), the CPU 101 checks a source program of the displayed web page (step S902) to determine whether the source program includes any invalid keyword (invalid keyword stored in the memory 102) which invalidates the link to another web page (step S903).

When the invalid keyword is determined not to be included, the web browser operates in the same manner as that installed in a general PC and the like, thereby making access to a linked URL (step S905). In contrast, when the invalid keyword is included, the press is invalidated (nothing occurs by this press) (step S904).

Figure 5:
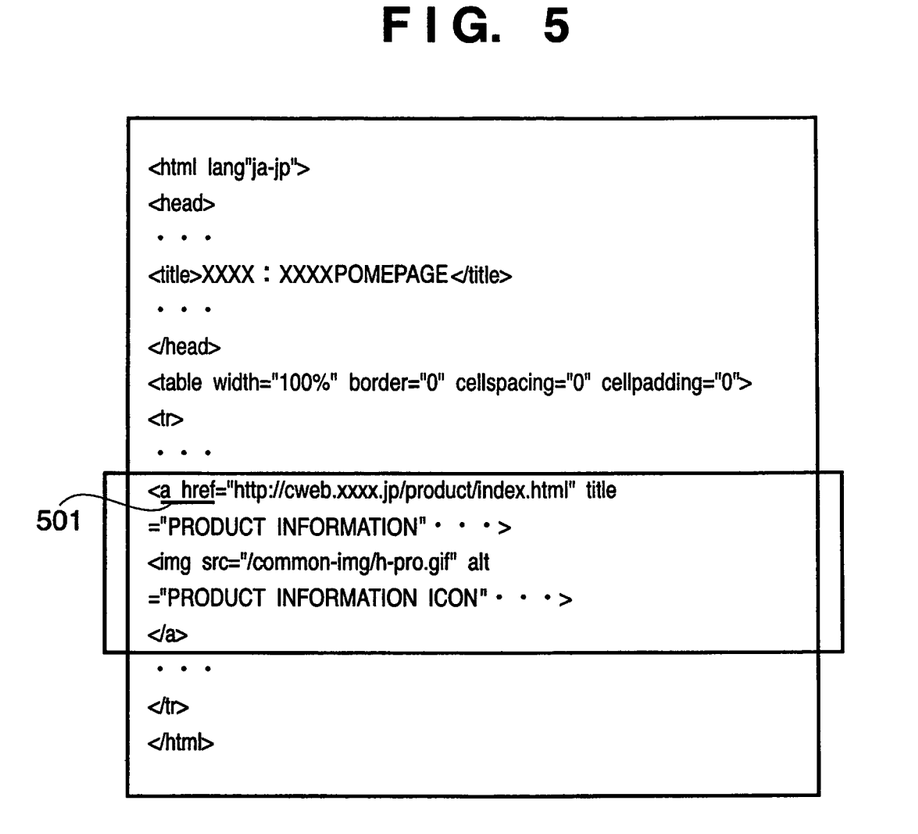
FIG. 5 is a view showing an example of a source program of a window displayed in a web browser.

In this embodiment, when press information by a user is detected, a source program (FIG. 5) written in HTML is checked to determine whether a <a href> tag as an invalid keyword for a link to another web page is executed by the press.

In the case of "product information" indicated by the icon 402 in FIG. 4, since <a href="http://cweb.xxxx.jp/product/index.html"> . . . </a> and its URL are written in the source program using <a href> tags (FIG. 5), this press is invalidated.

Note that <a href> tag is used to restrict access in this embodiment. However, in the same site, i.e., when a linked web page and the URL of the currently displayed web page are in the same domain or in the same sub domain, access to the linked web page is permitted and display of the web page may be shifted depending on the invalid keyword stored in the memory 102. When the linked web page and the favorites registered in the memory 102 are in the same web site (same domain), access to the linked web page may be determined to be permitted and display of the web page may be shifted. When the linked web page is a site predetermined by an administrator or the like independently of favorites, registered in the memory 102, and permitted as an access destination, the web page may be set to be accessible. When displaying a retrieval result based on the input retrieval condition, a web site whose access is not permitted may be inhibited from being displayed as a retrieval result. A shift to a web page displayed by executing another language (e.g., Java Script) other than HTML may be inhibited. When an accessed content is a file which is generated by a PC application and cannot be open without using the PC application, access to the content may be inhibited. Furthermore, access to a file such as an executable file dependent on an application or OS (Operating System) can be inhibited.

Figure 6:
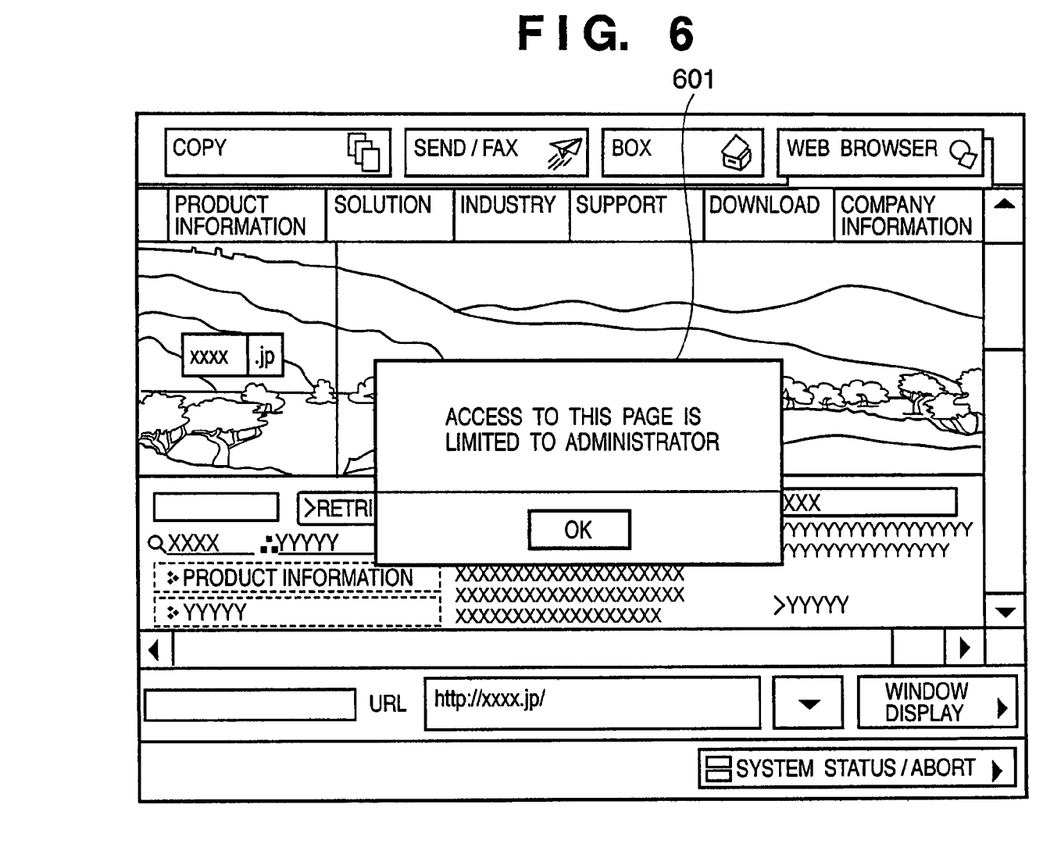
FIG. 6 is a view showing an example of a warning window displayed when an icon for a link to another page is pressed.

When it is determined that a link to an access-inhibited web page is pressed, the press is not invalidated, but a warning window 601 which inhibits a shift to the link destination may be displayed as shown in FIG. 6. Alternatively, the window may shift to the initial window (icon-displayed initial window) (these control operations are performed by the CPU 101).

With the arrangements described above, the accessible web pages can be more strictly limited even after initial window display.

As is apparent from the above description, according to this embodiment, the window in which favorites are iconized and displayed (icon-displayed initial window) is displayed when activating the web browser. This saves labor to search for a favorites function from many other functions in the web browser, and also makes it possible to readily find and select the target web page information (the operability can be improved).

In the case of a web browser running on a general PC, it is hard to visualize the contents of favorites because favorites are displayed in a list only by character information. In addition, the list display may disappear when a wrong area is selected. According to this embodiment, these problems can be solved.

Furthermore, a link to another web page is invalidated even after initial window display. This suppresses the capacity of a storage device and more strictly restricts access to a web page including charged service or harmful information.

Note that it is possible to more strictly restrict access by combination with a function of limiting favorites function editing to specific limited users (e.g., administrator) or a function of restricting access to an arbitrary web site by directly inputting a URL to the URL address display area 401.

Second Embodiment

In the first embodiment, access is always invalidated in access restriction after initial window display when an invalid keyword is included. The present invention is not particularly limited to this, and, for example, when restricting access, access restriction may be excluded for a specific user or a user who is permitted to make access.

Note that in this embodiment, since operation and procedure until a CPU 101 determines that a link to another web page is pressed are the same as in the first embodiment, a description thereof will be omitted.

When a user presses a link to another web page, the CPU 101 displays a password input window 701 (FIG. 7) and prompts input of a user ID and password. The user presses an ID input area 702 showing "ID" in the password input window 701 to input an ID.

Figure 8:
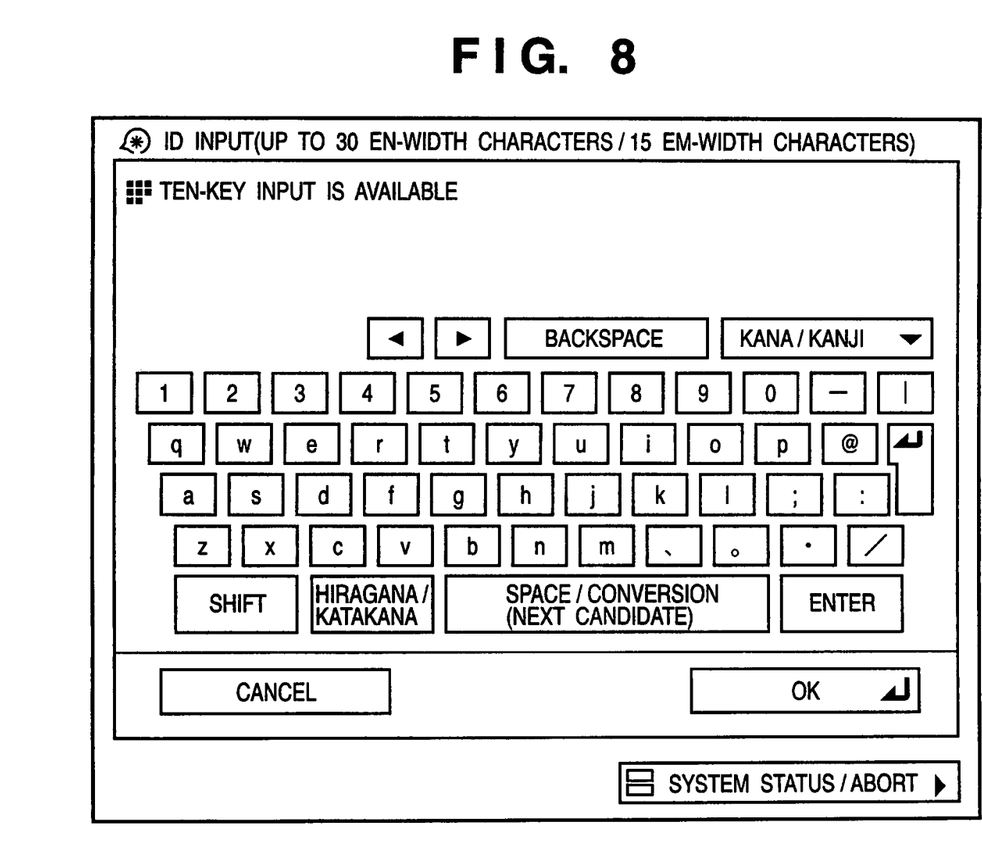
FIG. 8 is a view showing an example of an ID input window by a soft keyboard.

Then, a soft keyboard window as shown in FIG. 8 is displayed and the user inputs the ID to this window (the ID may be input by using a hardkey or ten-key pad attached to a main body). The password is input in the same manner. When both the ID and password have been input, an "OK" button 703 is pressed.

Figure 7:
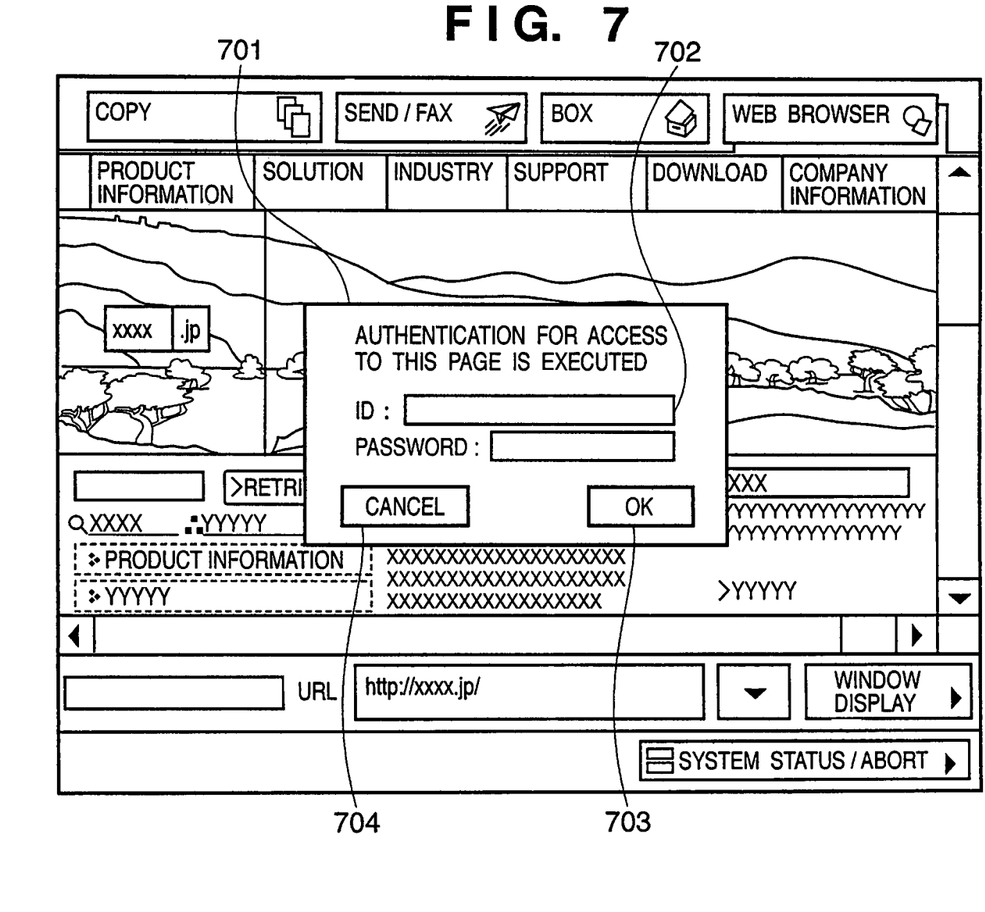
FIG. 7 is a view showing an example of an authentication window displayed when an icon for a link to another page is pressed.

When the CPU 101 detects that the "OK" button 703 has been pressed, the CPU 101 determines whether the input ID and the password corresponding to the ID are correct according to a pair of the ID and password stored in a memory 102.

When a "cancel" button 704 is pressed, the password input window 701 is closed and the window returns to the web page displayed prior to the password input window 701.

When the CPU 101 determines that the input contents are correct, an access destination web page is displayed. On the other hand, when the input contents are determined to be wrong, the password input window 701 is closed to return to the web page displayed prior to the password input window 701.

With this arrangement, when a user is determined as a specific user by inputting the ID and password, the user can access another web page.

Note that in the above description, password input is requested when a link to another web page is pressed, and the web page is displayed when the password is correct. However, password input may be requested when an image processing apparatus is activated (at the time of first input after the apparatus is turned on) or when a web browser icon 204 is pressed.

In the above description, a password is used as a determination method of determining access permission. However, information about access permission may be stored in an ID card (IC card or smart card) and access permission may be determined by checking information in the ID card. An item for restricting access of the web browser may be added to a common setting item of the image processing apparatus and access permission may be determined by checking whether this item is "ON" or "OFF".

A method of specifying a user is not limited to the use of a password and ID as described above. For example, when user access is detected, access permission may be inquired of an administrator or a user who registered favorites, thereby determining access permission on the basis of the inquiry result. More particularly, access permission is inquired in the following manner.

Before a user uses the web browser, two pieces of information are stored in the memory 102 in advance.

The first information is the name of a user who uses the web browser. The user name can be obtained by inputting the name when the user starts to use the web browser or by invoking the contents stored in the memory 102.

The second information is contact information of an administrator (email address: GazoKeiseiSouti@172.24.xxx.xxx in this case) of the image processing apparatus. Note that contact information of a user who has registered favorites can be registered in addition to the contact information of the administrator. However, in this embodiment, only the contact information of the administrator is stored for descriptive convenience.

Assume that the name of the user who uses the web browser and the contact information of the administrator are stored in the memory 102. When the user presses link information to another web page, an email message (FIG. 10) describing a user name 1002 and pressed link information 1003 is automatically sent to contact information of an administrator 1001 through a network communication unit 106 to inquire access permission.

Figure 10:
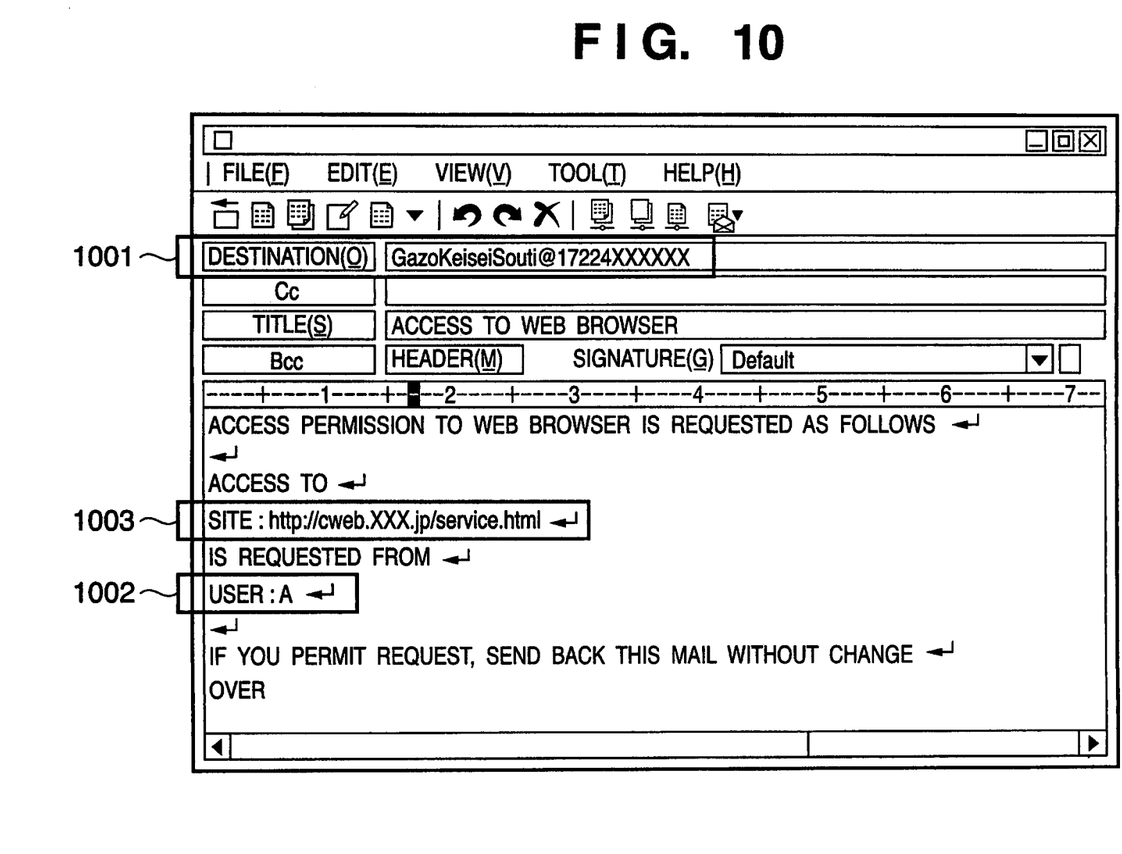
FIG. 10 is a view showing an example of a window for inquiring access permission received by an administrator.

The administrator who receives an inquiry by the email message sends back the message to the image processing apparatus if the access is permitted. If the access is not permitted, no message is sent back.

In this manner, when user access is detected, access permission is inquired of the administrator. With this arrangement, different access permissions can be controlled for one user depending on web pages. This can implement further specific access restriction.

Note that an email message is used as an inquiring method to an administrator in this embodiment. However, the present invention is not particularly limited to this, and a FAX or telephone can be used to make a similar inquiry.

Third Embodiment

In the first embodiment, access is invalidated in access restriction after initial window display when an invalid keyword is included. The present invention is not particularly limited to this. For example, access may be restricted within a predetermined number of times (to be referred to as a maximum access count hereinafter) even to a web page in the same domain, or access may be invalidated or temporarily awaited according to the status of a CPU 101 or memory 102 of a currently used image processing apparatus.

Note that in this embodiment, since operation and procedure until the CPU 101 determines that a link to another web page is pressed are the same as in the first embodiment, a description thereof will be omitted.

Figure 11:
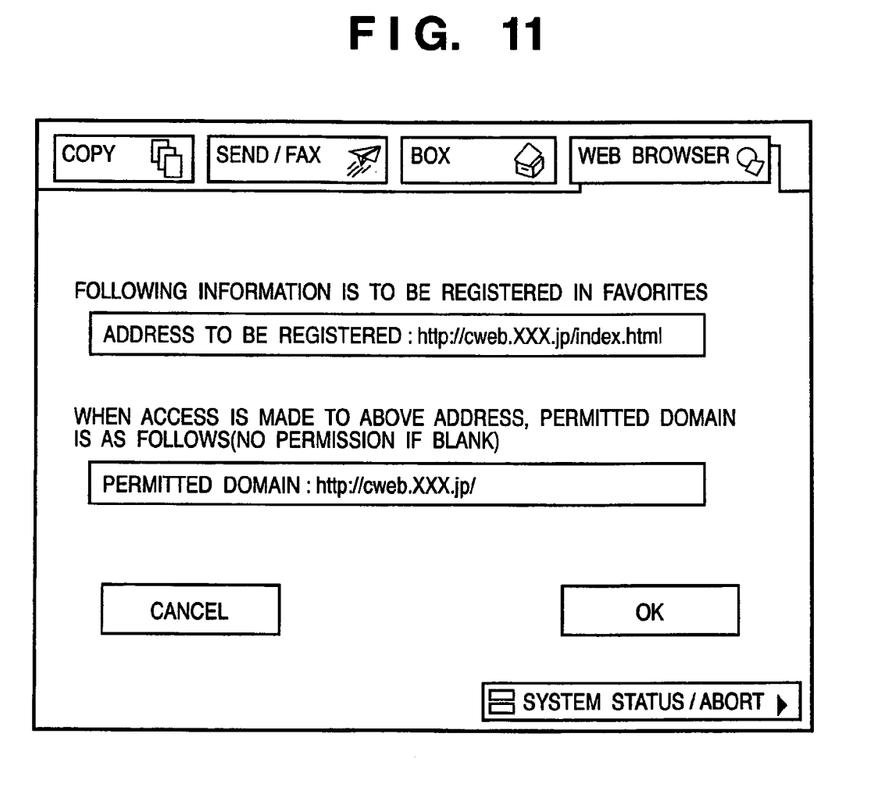
FIG. 11 is a view showing an example of a window for setting a permission domain when registering favorites.

In this embodiment, assume that, when a favorite is registered in advance, a domain (http://cweb.XXX.jp/, in this case) which is to be permitted when access to the favorite is made is also stored in the memory 102 corresponding to the favorite as shown in FIG. 11. In a window of FIG. 11, one permitted domain can be set for one favorite. However, a plurality of domains may be set for one favorite. One or more inaccessible domains may be set instead of a permitted domain. Assume that a user presses a link (http://cweb.XXX.jp/product.html, in this case) to another web page in the favorites (http://cweb.XXX.jp/index.html, in this case) selected from the initial window.

When the CPU 101 detects access to another web page, the access count from the initial display window stored in the memory 102 is initialized to 0. Assume that the maximum access count is set to be 1 in this embodiment.

Figure 12:
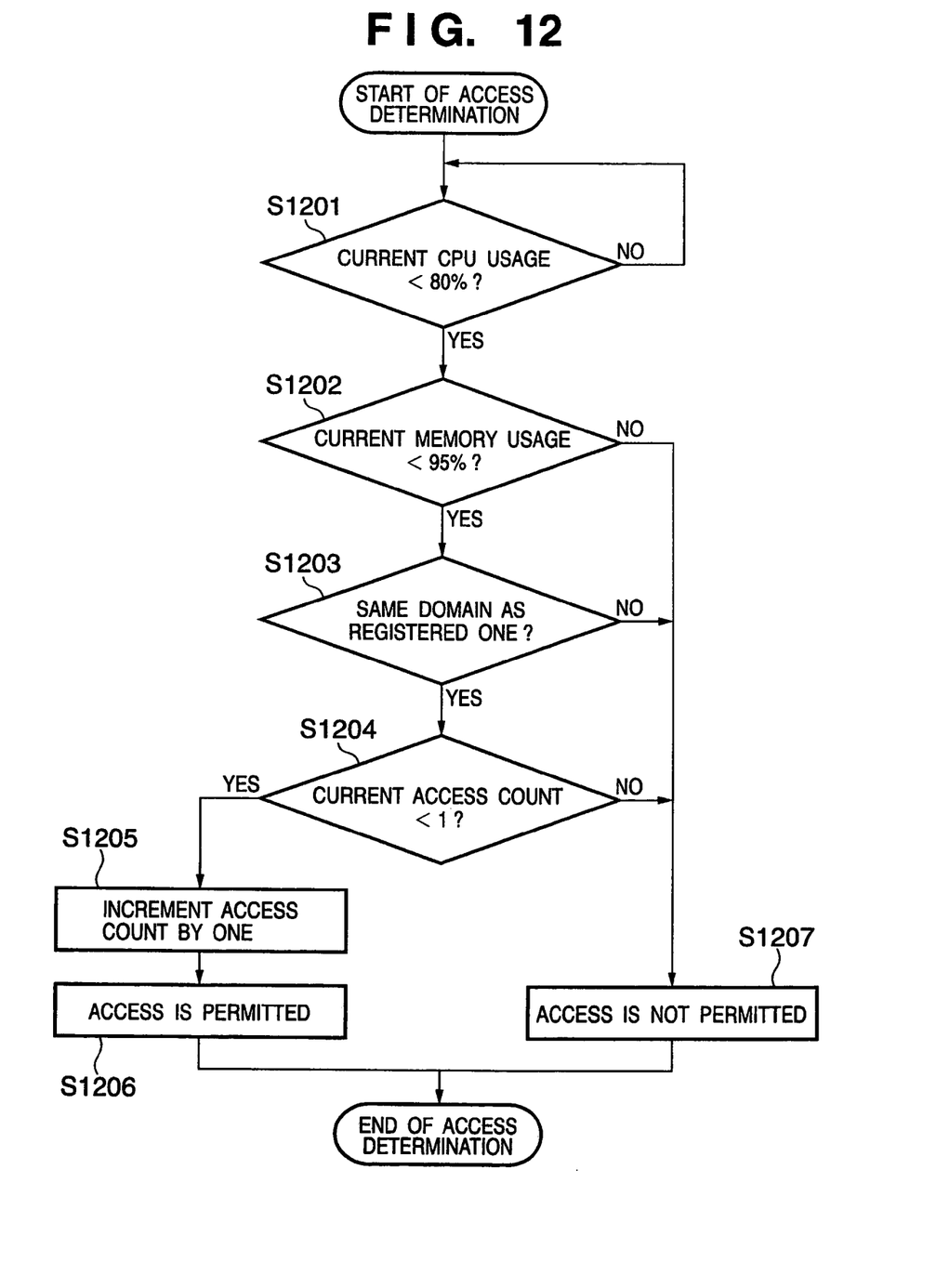
FIG. 12 is a flowchart showing the flow of processing for executing access determination after initial window display.

After the initialization, access determination processing according to a flowchart shown in FIG. 12 is executed by the CPU 101.

First, in step S1201, the current usage of the CPU 101 of the image processing apparatus is checked. It is determined whether the usage is a predetermine usage (80% in this case) or more. When the usage is less than 80%, the flow advances to step S1202 and the current usage of the memory 102 is checked. When the current usage of the CPU 101 is determined to be 80% or more in step S1201, the usage of the CPU 101 is monitored and the CPU 101 stands by (i.e., the access is temporarily awaited) until the usage becomes less than 80%.

When the usage of the CPU 101 is determined to be less than 80% in step S1201, the usage of the memory 102 is checked in step S1202 to determine whether the usage becomes a predetermined usage (95% in this case) or more.

When the usage of the memory 102 is determined to be less than 95% in step S1202, the flow advances to step S1203 to check address information of a link destination. Alternatively, if the usage is determined to be 95% or more, the access is determined not to be permitted (step S1207) and the linked web page is not accessed.

When the usage of the memory 102 is determined to be less than 95% in step S1202, the flow advances to step S1203 to check the address of the link destination selected by the user. It is determined whether the address is included in a domain (i.e., the address has the same domain) registered corresponding to the web page selected in the initial window.

When it is determined to have the same domain, the flow advances to step S1204 to check the access count. Alternatively, the access is determined not to be permitted (step S1207) and the linked web page is not accessed.

In this embodiment, since the accessed web page (http://cweb.XXX.jp/product.html) is included in the registered domain (http://cweb.XXX.jp/), the flow advances to the next step (step S1204).

When it is determined to have the same domain in step S1203, it is determined whether the current access count is a predetermined count (1 in this case) or more in step S1204. When the current access count is determined to be less than 1, the flow advances to step S1205 to check the current access count. Otherwise, the access is determined not to be permitted (step S1207) and the linked web page is not accessed.

When determined to be less than 1 in step S1205, the current access count is incremented by one in step S1205. This value (1 in this case) is stored in the memory 102 and the access to the linked web page is determined to be permitted in step S1206.

As the result of the above access determination processing, when the access to the web page is determined to be permitted, a linked web page selected by the user is displayed.

Assume that in this state (state in which web page, http://cweb.XXX.jp/product.html, is displayed), access to another linked web page, http://cweb.XXX.jp/product/0711.html, is attempted. In this case, even though the usage of the CPU 101 is less than 80% and the usage of the memory 102 is less than 95%, since the current access count (1 in this case) is the maximum access count (1 in this case) or more, the access can not be made (the access is not permitted in step S1204).

As is apparent from the above description, according to this embodiment, access is restricted on the basis of the usages of the memory and CPU of the image processing apparatus. This makes it possible to restrict access without affecting processing of functions other than the web browser of the image processing apparatus. Also, access is restricted according to access count. This makes it possible to more strictly restrict access. Access restriction according to access count is applicable, for example, when flexible access to sites in the same domain is demanded although information included in the domain is not completely grasped.

Other Embodiment

Note that the present invention may be applied to a system constituted by a plurality of devices (e.g., a host computer, an interface device, a reader, a printer, and the like), or an apparatus comprising a single device (e.g., a copying machine, facsimile apparatus, or the like).

The object of the present invention can also be achieved by supplying a storage medium which stores software program codes for implementing the functions of the above-described embodiments to a system or apparatus and causing the computer (or a CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention.

As the storage medium for supplying the program code, for example, a Floppy® disk, hard disk, optical disks magneto-optical disk, CD-ROM, CD-R, magnetic tape, nonvolatile memory card, ROM, or the like can be used.

The functions of the above-described embodiments are implemented not only when the readout program codes are executed by the computer but also when an OS (Operating System) running on the computer performs part or all of actual processing on the basis of the instructions of the program codes.

The functions of the above-described embodiments are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is not limited to the above embodiments and various changes and modifications can be made within the spirit and scope of the present invention. Therefore to apprise the public of the scope of the present invention, the following claims are made.

CLAIM OF PRIORITY

This application claims priority from Japanese Patent Application No. 2004-360494 filed on Dec. 13, 2004, and Japanese Patent Application No. 2005-170051 filed on Jun. 9, 2005, which are hereby incorporated by reference herein.

What is claimed is:

1. An image processing apparatus, comprising:
   a web browser capable of displaying a web page and configured to change a web page being displayed in accordance with a user's operation; and
   a processor configured to, in a case where the user's operation corresponds to a designation of a link attribute which is included in the web page being displayed and which indicates a change of the web page being displayed, check for whether or not the link attribute includes an invalid keyword, wherein the invalid keyword is a specific tag, wherein the processor is configured to:
   in a case where the link attribute includes the invalid keyword, invalidate the change of the web page being displayed;
   in a case where the link attribute does not include the invalid keyword, allow the change of the web page being displayed; and
   in a case where the user's operation corresponds to a designation using a bookmark of the web browser, allow the change of the web page being displayed.

2. The image processing apparatus according to claim 1, wherein the invalid keyword is an "<a>" tag.

3. The image processing apparatus according to claim 1, wherein the web browser performs control not to accept a user's input of a URL.

4. The image processing apparatus according to claim 1, wherein the image processing apparatus is a printing apparatus.

5. The image processing apparatus according to claim 1, wherein when the web browser is activated, the web browser displays, as an initial screen, a list of content information which is registered as the bookmark.

6. A control method for controlling an image processing apparatus which includes a web browser capable of displaying a web page and configured to change a web page being displayed in accordance with a user's operation, the control method comprising:
   in a case where the user's operation corresponds to a designation of a link attribute which is included in the web page being displayed and which indicates a change of the web page being displayed, check for whether or not the link attribute includes an invalid keyword, wherein the invalid keyword is a specific tag;
   in a case where the link attribute includes the invalid keyword, invalidating the change of the web page being displayed;
   in a case where the link attribute does not include the invalid keyword, allowing the change of the web page being displayed; and
   in a case where the user's operation corresponds to a designation using a bookmark of the web browser, allowing the change of the web page being displayed.

7. A non-transitory computer-readable storage medium storing a computer program for causing a computer to execute a control method for controlling an image processing apparatus which includes a web browser capable of displaying a web page and configured to change a web page being displayed in accordance with a user's operation, the control method comprising:
   in a case where the user's operation corresponds to a designation of a link attribute which is included in the web page being displayed and which indicates a change of the web page being displayed, check for whether or not the link attribute includes an invalid keyword, wherein the invalid keyword is a specific tag;
   in a case where the link attribute includes the invalid keyword, invalidating the change of the web page being displayed;
   in a case where the link attribute does not include the invalid keyword, allowing the change of the web page being displayed; and
   in a case where the user's operation corresponds to a designation using a bookmark of the web browser, allowing the change of the web page being displayed.

* * * * *